US009816511B2

(12) United States Patent
Marcucci et al.

(10) Patent No.: US 9,816,511 B2
(45) Date of Patent: Nov. 14, 2017

(54) TURNING GEAR FOR GAS TURBINE ARRANGEMENTS

(71) Applicant: Nuovo Pignone S.p.A., Florence (IT)

(72) Inventors: Daniele Marcucci, Florence (IT); Giuliano Milani, Florence (IT)

(*) Notice: Subject to any disclaimer, the term of this patent is extended or adjusted under 35 U.S.C. 154(b) by 1005 days.

(21) Appl. No.: 13/710,767

(22) Filed: Dec. 11, 2012

(65) Prior Publication Data
US 2013/0149102 A1 Jun. 13, 2013

(30) Foreign Application Priority Data
Dec. 12, 2011 (IT) ................. FI2011A0269

(51) Int. Cl.
*F01D 25/36* (2006.01)
*F04D 17/10* (2006.01)
(Continued)

(52) U.S. Cl.
CPC ............ *F04D 17/10* (2013.01); *F01D 15/12* (2013.01); *F01D 25/002* (2013.01); *F01D 25/36* (2013.01);
(Continued)

(58) Field of Classification Search
CPC ........ F04D 25/02; F04D 25/16; F04D 25/163; F04D 17/10; F02C 7/268; F02C 7/32;
(Continued)

(56) References Cited

U.S. PATENT DOCUMENTS

| 1,634,894 A | * | 7/1927 | Allen ................. F01D 25/36 |
| | | | 415/1 |
| 2,962,597 A | | 11/1960 | Evans |
| | | | (Continued) |

FOREIGN PATENT DOCUMENTS

| CN | 101153559 A | 4/2008 |
| CN | 101280726 A | 10/2008 |
| | (Continued) | |

OTHER PUBLICATIONS

Unofficial English translation of Chinese Office Action issued in connection with corresponding CN Application No. 201210533989.3 dated Aug. 3, 2015.
(Continued)

*Primary Examiner* — Gregory Anderson
*Assistant Examiner* — Danielle M Christensen
(74) *Attorney, Agent, or Firm* — GE Global Patent Operation

(57) ABSTRACT

An apparatus for driving a load is provided. The apparatus comprises a multiple-shaft gas turbine comprising a high pressure compressor and a high pressure turbine drivingly connected to one another by a first gas turbine shaft and a low pressure compressor and a power turbine drivingly connected to one another by a second gas turbine shaft extending coaxial with the first gas turbine shaft, the high pressure compressor and the high pressure turbine. The apparatus also comprises a load coupling drivingly connecting the power turbine to the load and a dual-speed turning gear with an output shaft drivingly engageable to and disengageable from the load, the dual-speed turning gear comprising a low speed turning motor and a high speed turning motor, wherein the low speed turning motor and the high speed turning motor are configured to selectively drive the load.

22 Claims, 3 Drawing Sheets

(51) Int. Cl.
*F01D 15/12* (2006.01)
*F01D 25/00* (2006.01)
*F02C 7/268* (2006.01)
*F02C 7/32* (2006.01)
*F02C 7/36* (2006.01)

(52) U.S. Cl.
CPC ............... *F02C 7/268* (2013.01); *F02C 7/32* (2013.01); *F02C 7/36* (2013.01); *F05D 2220/74* (2013.01); *F05D 2260/4031* (2013.01); *F05D 2260/607* (2013.01); *Y02T 50/672* (2013.01); *Y02T 50/675* (2013.01)

(58) Field of Classification Search
CPC ...... F02C 7/36; F02C 7/26; F02C 3/10; F02C 3/107; F02C 3/113; F05B 2260/40; F05B 2260/4023; F01D 25/36; F01D 25/002; F01D 15/12
USPC ................ 415/122.1, 123; 416/169 R, 170 R
See application file for complete search history.

(56) References Cited

U.S. PATENT DOCUMENTS

| | | | |
|---|---|---|---|
| 3,485,041 | A | 12/1969 | Evans |
| 3,919,894 | A | 11/1975 | Keeter |
| 3,951,008 | A | 4/1976 | Schneider |
| 4,627,234 | A | 12/1986 | Schuh |
| 4,833,171 | A * | 5/1989 | Sweeney .................. C01B 3/36 252/373 |
| 7,481,062 | B2 | 1/2009 | Gaines |
| 7,997,085 | B2 | 8/2011 | Moniz et al. |
| 8,015,828 | B2 | 9/2011 | Moniz et al. |
| 2006/0081521 | A1 | 4/2006 | Hjerpe et al. |
| 2007/0000528 | A1* | 1/2007 | Asplund .................. B08B 3/02 134/166 R |
| 2007/0151258 | A1 | 7/2007 | Gaines |
| 2009/0054191 | A1 | 2/2009 | Holt et al. |
| 2009/0193785 | A1* | 8/2009 | Siden ..................... F01D 15/10 60/39.15 |
| 2010/0005810 | A1* | 1/2010 | Jarrell ..................... F02C 3/107 60/792 |
| 2010/0219779 | A1 | 9/2010 | Bradbrook |
| 2010/0242495 | A1 | 9/2010 | Demoss et al. |
| 2010/0300117 | A1 | 12/2010 | Moulebhar |
| 2011/0138816 | A1 | 6/2011 | Takeda et al. |
| 2011/0154805 | A1 | 6/2011 | Heathco et al. |

FOREIGN PATENT DOCUMENTS

| | | |
|---|---|---|
| GB | 1000877 | 8/1965 |
| JP | 54158901 U | 11/1979 |
| JP | 60011634 A | 1/1985 |
| JP | 63295806 A | 12/1988 |
| JP | 07174031 A | 7/1995 |
| JP | 10121908 A | 5/1998 |
| JP | 2007113412 A | 5/2007 |
| JP | 2009529117 A | 8/2009 |
| JP | 2010116831 A | 5/2010 |
| RU | 2168163 C1 | 5/2001 |
| RU | 2412086 C2 | 2/2011 |
| SE | 388663 | 10/1976 |

OTHER PUBLICATIONS

Italian Search Report and Written Opinion from corresponding Italian Application No. FI20110269, dated Aug. 30, 2012.
Italian Search Report from corresponding Italian Application No. FI2011A000269, dated Aug. 30, 2012.
Unofficial English Translation of Japanese Office Action issued in connection with corresponding JP Application No. 2012268916 dated Jan. 17, 2017.
Unofficial English translation of Office Action issued in connection with corresponding RU Application No. 2012153182 dated Sep. 2, 2016.
Unofficial English translation of Office Action and Search Report issued in connection with corresponding JP Application No. 2012-268916 dated Sep. 13, 2016.

* cited by examiner

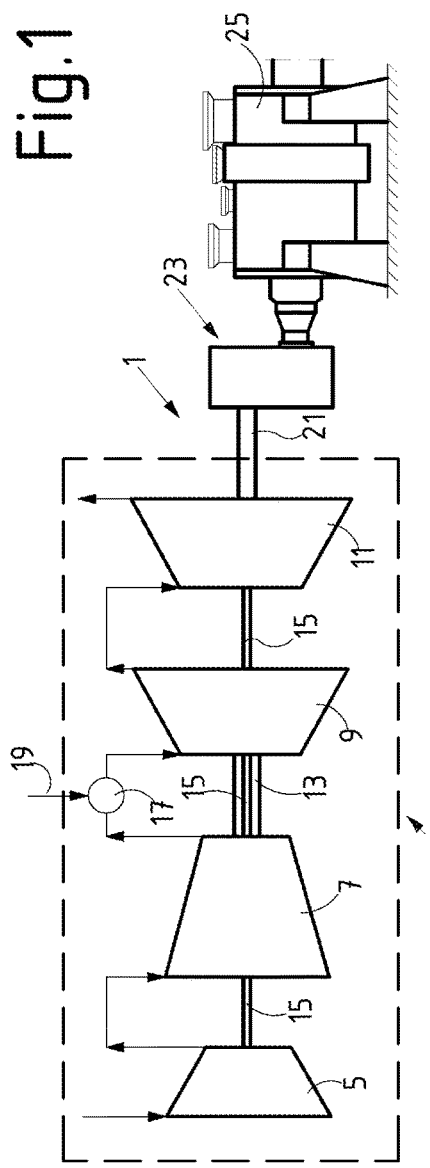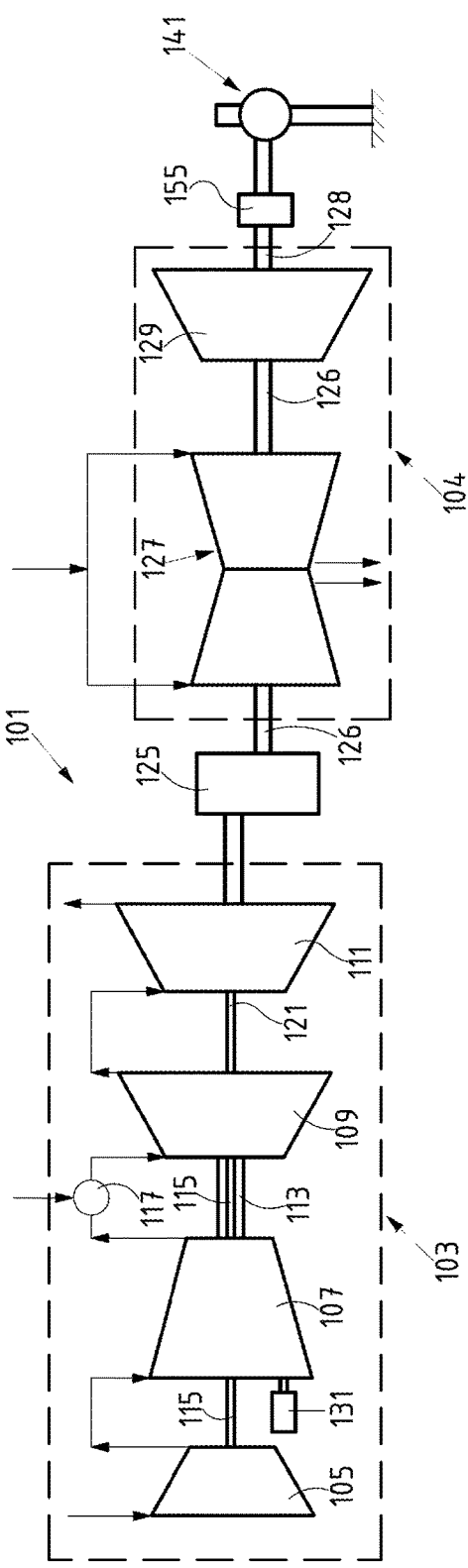

TURNING GEAR FOR GAS TURBINE ARRANGEMENTS

BACKGROUND OF THE INVENTION

Embodiments of the present invention relate to gas turbines in mechanical drive applications. More specifically, the subject matter disclosed herein concerns multiple-shaft gas turbines, such as aeroderivative twin-shaft gas turbines for mechanical drive applications.

Gas turbines have found a wide use in several applications, such as power generation, as well as mechanical drive, where the gas turbines are commonly used as first mover for one or a plurality of driven machines, such as compressors, in particular, centrifugal compressors. Typical mechanical drive applications are in the field of natural gas liquefaction, carbon dioxide recovery and the like.

A gas turbine includes one or more sequentially arranged air compressors for compressing ambient air, a combustor burning fuel together with the compressed air and one or more turbines for driving the compressor(s) and generate useful mechanical power. The power generated by the turbine(s) exceeding that required to drive the compressor(s) is used for driving the load.

Gas turbines ingest a large amount of air. Particles in the form of aerosols present in the air sucked by the gas turbine partly exit the gas turbine with the exhaust gases. However, there are particles which contaminate the turbomachinery, by sticking to the stationary vanes and to the rotary blades thereof. This contamination, also called fouling, particularly negatively affects the initial part of the flow path within the gas turbine, i.e. the compressor or compressors. Contaminants forming deposits on the stationary blades (vanes) and rotary blades of the compressor alter the geometry of the blades and increase gas friction, thus reducing the overall compressor efficiency. In particular, the particles stuck to the surfaces of the vanes and the rotary blades of the compressor alter the aerodynamic properties of the flow passages defined by the blades and the vanes. The alteration of the aerodynamic properties causes loss of mass flow and therefore reduction of the compressor efficiency.

Typically the compressor of a gas turbine consumes the major part of the power generated by the turbine or turbines, i.e. approximately 60% of said power. A reduction in the compressor efficiency thus negatively affects the overall efficiency of the gas turbine, reducing the power available for driving the load.

One of the ways to reduce fouling of the compressor in a gas turbine is to wash the gas paths in the gas turbine. Washing is typically practiced by injecting a washing liquid in the gas path upstream of the compressor inlet. The turbomachinery is allowed to rotate during washing such that the liquid is forced through the compressor and exits at the rear of the gas turbine. The wash liquid can contain water and chemical additives and is fed in the form of a fine spray which will distribute the washing liquid over the entire compressor inlet face. Atomization is provided by suitable nozzles which are fed with pressurized washing liquid.

An effective way of washing the gas turbine is the so-called offline washing. In this case washing is performed while the gas turbine is not fired, but is turning at a rotary speed which is a fraction of the rated rotary speed during normal operation, i.e. when running at load. An additional mover is required, to keep the gas turbine rolling at offline washing speed.

Online washing is also possible. In this case the gas turbine is washed while running under load conditions. Such washing process is, however, less effective, due to the speed and temperature conditions in the compressor, which result in inefficient washing of the blades, centrifugation of the washing liquid towards the casing of the compressor and evaporation of the washing liquid due to the temperature increase provoked by the high compression ratio. When online washing is used, fouling of the compressor can only be reduced but not avoided. Therefore, offline washing capability must anyhow be available. The gas turbine will in fact require offline washing when the amount of particle deposits on the vanes and rotary blades of the compressor becomes unacceptable, in spite of online washing.

Aeroderivative gas turbines are increasingly used for machine drive and power generation applications. Some aeroderivative gas turbines comprise a multi-shaft arrangement. A multi-shaft arrangement is one in which more than one shaft is provided, to drivingly connect turbines and compressors to one another. In some multi-shaft gas turbines, the power turbine, i.e. the turbine which provides the mechanical power to drive the load, is mechanically connected through one of the gas turbine shafts with one of the compressors.

FIG. 1 shows a schematic diagram of a twin-shaft aeroderivative gas turbine used in a typical mechanical drive application. Reference number 1 globally indicates an apparatus comprising a gas turbine and a load. The gas turbine 3 comprises a low pressure compressor 5, a high pressure compressor 7, a high pressure turbine 9 and a low pressure turbine, or power turbine 11. The high pressure compressor 7 is drivingly connected to the high pressure turbine 9 by means of a first gas turbine shaft 13. The low pressure turbine or power turbine 11 is drivingly connected to the low pressure compressor 5 by means of a second gas turbine shaft 15, arranged coaxial with the first gas turbine shaft 13 as well as coaxial with the high pressure turbine 9 and the high pressure compressor 7.

Ambient air is compressed by the low pressure compressor 5 and by the high pressure compressor 7 and enters a combustor 17 where gaseous or liquid fuel is added to the compressed air stream and burned to generate a flow of high-pressure, high-temperature combustion gases. The combustion gases are sequentially expanded in the high pressure turbine 9 and in the low pressure turbine 11 before being discharged.

The power generated by the expansion of the combustion gases in the high-pressure turbine 9 is entirely exploited to drive the high pressure compressor 7. Conversely, the mechanical power generated by expanding the combustion gases in the low pressure turbine 11 is only partly used to drive the low pressure compressor 5. A large amount of the mechanical power available on the low pressure turbine 11 output shaft 21 is used to drive the load.

The output shaft 21 of the power turbine or low pressure turbine 11 forms part of a load coupling 23, which transmits the mechanical power from the gas turbine 3 to a load. In the example of FIG. 1 the load is represented as a centrifugal compressor 25. A gear box 27 is provided in this exemplary embodiment between the gas turbine output shaft 21 and the centrifugal compressor 25. A gear box is usually provided when the rotary speed of the low pressure turbine on the one hand and of the load on the other is not identical in terms of rpm or if it has to be reversed. In some embodiments the power turbine 11 can be directly connected to the load shaft, i.e. to the shaft of an electric generator or a turbomachinery, such as a centrifugal compressor.

In a twin shaft aeroderivative gas turbine as the one illustrated in FIG. 1, washing of the compressors 5 and 7 requires both the first (high pressure) and the second (low pressure) gas turbine shafts to be rotated. The former is rotated with the onboard starting motor of the gas turbine itself, the latter requires an external mover. Moreover, rotating the second gas turbine shaft requires high power input because the second gas turbine shaft is permanently mechanically connected to the load.

Gas turbines are also used as prime movers in power generation applications, wherein mechanical power available on the gas turbine output shaft is used to drive an electric generator. The electric generator converts mechanical power from the gas turbine into electric power. Single-shaft gas turbines are often used in power generation applications of this kind. The gas turbine comprises a compressor and a turbine, mechanically connected to one another by a shaft. Compressed air provided by the compressor is delivered to a combustor and mixed with fuel therein. The air-fuel mixture is ignited to produce compressed hot combustion gases. The combustion gases are expanded in the gas turbine to generate mechanical power. Part of the mechanical power produced by the turbine is used to drive the compressor. Excess mechanical power is available on the single gas turbine shaft for driving the electric generator.

In order to start the single-shaft gas turbine and the electric generator mechanically linked thereto, the use of two combined movers is known. A first mover comprises a low speed electric motor. A second mover comprises a high speed, internal combustion engine. To start rotation of the gas turbine and generator train, the low speed electric motor is energized first. Once a pre-set rotary speed of the shaft line has been achieved, further acceleration of the system is performed by the high speed, internal combustion engine. The slow speed electric motor is also used for slow turning the power plant following shut down, to prevent bowing of the rotor aggregate of the gas turbine.

BRIEF DESCRIPTION OF THE INVENTION

An apparatus for driving a load is provided. The apparatus comprises a multiple-shaft gas turbine comprising a high pressure compressor and a high pressure turbine drivingly connected to one another by a first gas turbine shaft and a low pressure compressor and a power turbine drivingly connected to one another by a second gas turbine shaft extending coaxial with the first gas turbine shaft, the high pressure compressor and the high pressure turbine. The apparatus also comprises a load coupling drivingly connecting the power turbine to the load and a dual-speed turning gear with an output shaft drivingly engageable to and disengageable from the load, the dual-speed turning gear comprising a low speed turning motor and a high speed turning motor, wherein the low speed turning motor and the high speed turning motor are configured to selectively drive the load.

A method for offline washing of a multiple shaft gas turbine connected to a load is provided. The gas turbine comprises a high pressure compressor and a high pressure turbine drivingly connected to one another by a first gas turbine shaft, a low pressure compressor and a power turbine drivingly connected to one another by a second gas turbine shaft extending coaxial with the first gas turbine shaft, the high pressure compressor and the high pressure turbine. The method comprises providing a dual-speed turning gear with an output shaft drivingly engageable to and disengageable from the load, wherein the dual-speed turning gear comprises a low speed turning motor and a high speed turning motor, initially accelerating the low pressure compressor, the power turbine and the load with the low speed turning motor up to a first rotary speed, when the first rotary speed is reached, continuing accelerating the low pressure compressor, the power turbine and the load with the high speed turning motor until an offline washing rotary speed is reached; and maintaining the offline washing rotary speed while washing the gas turbine.

A method of slow-rolling a multi-shaft gas turbine and a load connected to the gas turbine is provided. The gas turbine comprises a high pressure compressor and a high pressure turbine drivingly connected to one another by a first gas turbine shaft, a low pressure compressor and a power turbine drivingly connected to one another by a second gas turbine shaft extending coaxial with the first gas turbine shaft, the high pressure compressor and the high-pressure turbine. The method comprises providing a dual-speed turning gear with an output shaft drivingly engageable to and disengageable from the load, wherein the dual-speed turning gear comprises a low speed turning motor and a high speed turning motor, selectively slow-rolling the load and the second gas turbine shaft at a slow-rolling speed with the low speed turning motor during cooling of the gas turbine and the load following shut-down of the gas turbine, or rolling the load and the second gas turbine shaft at an offline washing speed, with the high speed turning motor during offline washing of the gas turbine, the offline washing speed being higher than the slow-rolling speed.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1 illustrates a compressor driven by gas turbine according to the state of the art;

FIG. 2 illustrates a gas turbine driving a compressor train provided with a dual-speed turning gear according to the subject matter disclosed herein;

DETAILED DESCRIPTION OF EXEMPLARY EMBODIMENTS OF THE INVENTION

Figure 3:
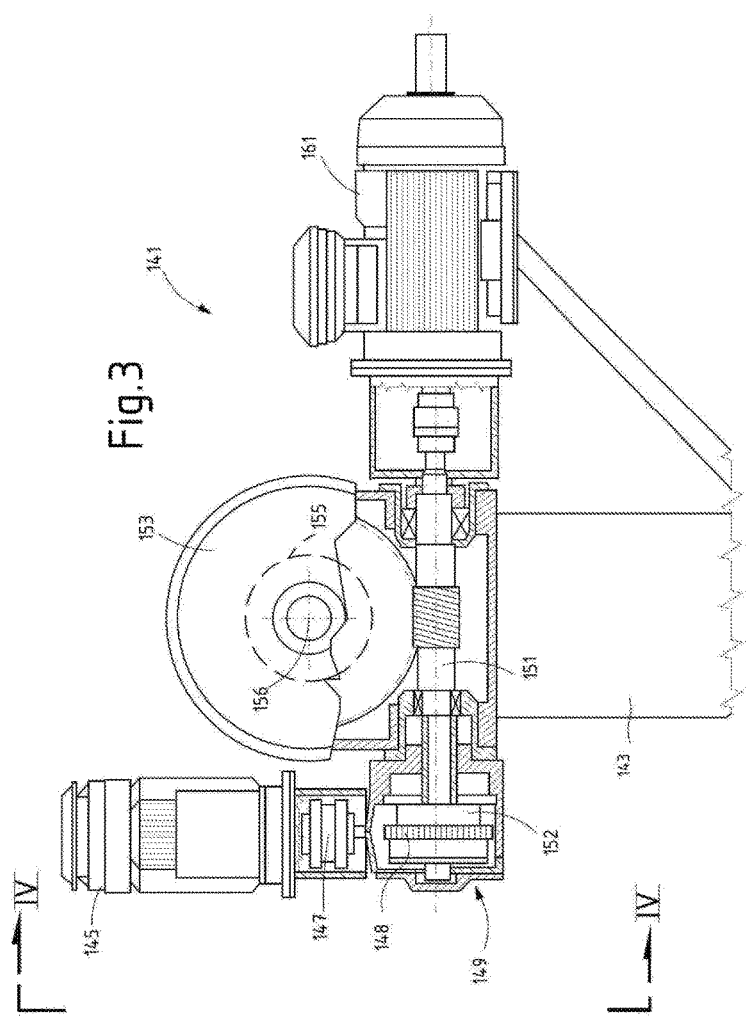
FIG. 3 illustrates a front view of the dual-speed turning gear.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

FIG. 2 illustrates a schematic diagram of a twin-shaft aeroderivative gas turbine used in a typical mechanical drive application. Reference number 101 globally indicates the apparatus comprising a gas turbine 103 and a load 104. The gas turbine 103 comprises a low pressure compressor 105, a high pressure compressor 107, a high pressure turbine 109 and a low pressure turbine or power turbine 111.

The high pressure compressor 107 is drivingly connected to the high pressure turbine 109 by means of a first gas turbine shaft 113. The power turbine 111 is drivingly connected to the low pressure compressor 105 by means of a second gas turbine shaft 115, arranged coaxial inside the first gas turbine shaft 113 as well as coaxial with the high pressure turbine 109 and the high pressure compressor 107.

Ambient air enters the low pressure compressor 105, is compressed at a first pressure level and subsequently enters the high pressure compressor 107 to be compressed at a final pressure level. The compressed air enters a combustor 117 where a gaseous or liquid fuel is added to the compressed air stream and burned to generate a flow of high-pressure, high-temperature combustion gases. The combustion gases are sequentially expanded in the high pressure turbine 109 and in the power turbine 111 before being discharged.

The mechanical power generated by the expansion of the combustion gases in the high pressure turbine 109 drives the high pressure compressor 107. The mechanical power generated by gas expansion in the power turbine 111 is partly used to drive the low pressure compressor 105. The exceeding mechanical power available on the shaft of the power turbine 111 is transferred to an output shaft 121 of the power turbine 111 to drive the load 104.

In the embodiment illustrated in FIG. 2 the output shaft 121 is connected to the load 104 through a gearbox 125. In other embodiments, not shown, the gearbox 125 can be dispensed with. An exit shaft 126 from the gearbox 125 transmits the power to the load 104. Therefore, the load, the power turbine 111 and the low pressure compressor 105 are permanently connected mechanically to one another.

In the embodiment illustrated in FIG. 2 the load 104 comprises a compressor train. The compressor train comprises in turn a first compressor 127 and a second compressor 129. By way of example only, as shown in FIG. 2 the first compressor 127 is a double compressor, having a double casing. The two compressors 127, 129 are driven by the same shaft 126 and rotate therefore at the same rotary speed. It shall be understood that the shaft 126 can be actually made of more than one shaft portion, connected to one another by suitable joints. In other embodiments, not shown, a further gearbox can be arranged between the first compressor 127 and the second compressor 129, for example if the two compressors require to be driven at different rotary speeds. In a possible embodiment, the gear box 125 can be dispensed with and a gearbox can be arranged between the first compressor 127 and the second compressor 129, for example if the first compressor 127 rotates at the same rotary speed as the power turbine 111 (direct drive) and the second compressor 129 is required to rotate at different speed.

In other embodiments, not shown, the load 104 can comprise more than just two compressors 127, 129, with or without gearboxes interposed therebetween.

A centrifugal compressor train 104 as schematically shown in FIG. 2 is typically used in natural gas liquefaction plants, wherein each centrifugal compressor is used to process a refrigerant gas or a mixture of refrigerant gases used to chill and finally liquefy a natural gas for storage or transportation.

In the embodiment shown in FIG. 2 the core of the gas turbine, comprising the high pressure compressor 107 and the high pressure turbine 109 connected to one another by the first gas turbine shaft 113, is provided with an auxiliary turning motor or starter 131, which can be used during offline washing of the gas turbine or for slow turning following shut down of the gas turbine, if required. Since the core of the gas turbine is not mechanically connected to the second gas turbine shaft 115, the low pressure compressor 105 and the power turbine 111 are not driven by the auxiliary motor 131. The auxiliary turning motor or starter 131 can be an electric motor or a hydraulic motor or another mover, having relatively low rated power.

For slow rolling or rotating the low pressure compressor 105 and the power turbine 111 as well as the load 104 during offline washing, the apparatus comprises a dual-speed turning gear 141 which can be selectively engaged with a shaft 128 of the last compressor 129 of the load 104. The dual-speed turning gear 141 is designed and controlled for slow-rolling the load 104, the power turbine 111 and the low pressure compressor 105 when the gas turbine is shut down, in order to prevent bowing of the centrifugal compressors 127, 129. The same dual-speed turning gear 141 is also designed and controlled to rotate the power turbine 111 and the low pressure compressor 105, as well as the load which is stably connected thereto, during offline washing of the gas turbine.

Figure 4:
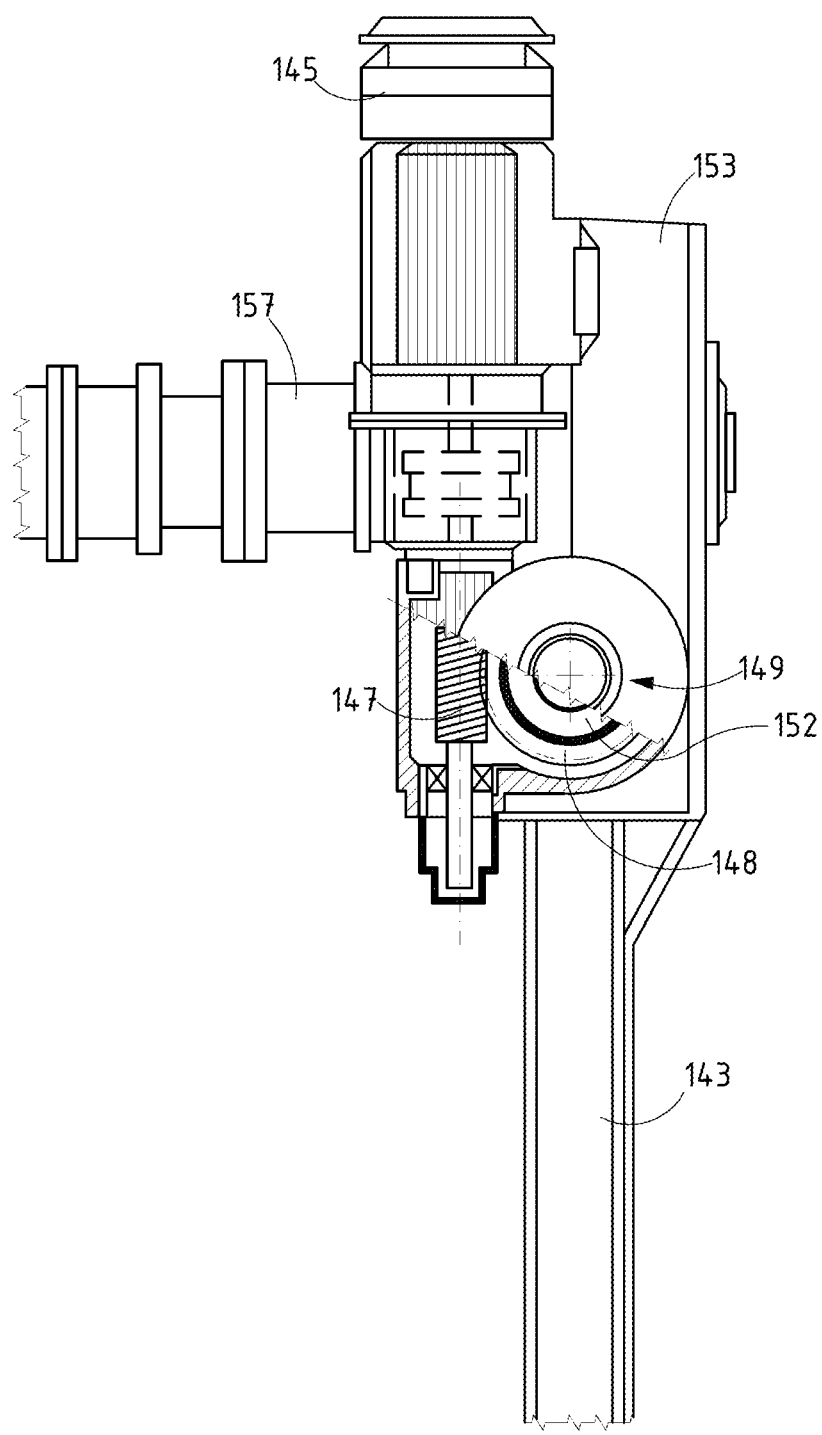
FIG. 4 illustrates a side view according to line IV-IV of the dual-speed turning gear of FIG. 3.

One embodiment of the dual-speed turning gear 141 is shown in FIGS. 3 and 4. The dual speed-turning gear 141 comprises a support 143 for connection to the foundation. Attached to the support 143 is a first turning motor 145, e.g. an electric motor, e.g. a three-phase electric motor. The first turning motor 145 drives into rotation a first shaft 147. The first shaft 147 drives a first worm gear 149 comprising a gear 148 connected to an output shaft 151 via an overrunning clutch 152. The shaft 151 is the input shaft of a second worm gear 153. The gear 155 of the worm gear 153 is keyed on an output shaft 156 of the dual-speed turning gear. Said output shaft 156 is frontally engageable to the load shaft 128 and disengageable therefrom via a synchro self-shifting clutch 157.

The dual-speed turning gear 141 further comprises a second turning motor, for example an electric motor, such as a three phase electric motor 161. The output shaft of the second turning motor 161 is coaxial to the shaft 151.

The first turning motor 145 and the second turning motor 161, as well as the transmission ratios of the worm gears 147 and 153 are chosen such that the appropriate rotary speeds are obtained for both slow-rolling of the centrifugal compressors 127, 129 as well as offline washing rotation of the power turbine 111 and the low pressure compressor 105. If one or more gearboxes such as gearbox 125 are provided along the load coupling which connects the power turbine 111 to the centrifugal compressors 127, 129 of the compressor train, the transmission ratios of the worm gears 147, 153 of the dual-speed turning gear 141 will be designed taking into account the transmission ratios of said gearboxes.

The first turning motor 145 is a slow speed turning motor and the second turning motor 161 is the high speed turning motor of the dual-speed turning gear 141. The terms "slow speed" and "high speed" are intended as relative terms and are referred to the speed of the output shaft 156 of the dual-speed turning gear 141. The speeds and the transmission ratios mentioned above are chosen such that the slow speed turning motor 145 can rotate the output shaft 156 and therefore the centrifugal compressors at a slow speed of about 0.5 to about 10 rpm, and more particularly for example between about 1 rpm and about 7 rpm. This rotary speed is suitable for slow rolling of the turbomachinery following shut down of the gas turbine, such as to prevent bowing of the centrifugal compressors during cooling thereof. The slow-roll speed ranges mentioned above are given by way of example only, and shall not be construed as limiting the scope of the present disclosure.

The second turning motor 161 and the speed ratio of the second worm gear 153 are chosen such that the second turning motor 161 can rotate the low pressure compressor 105 and the power turbine 111 at an offline washing rotary speed. Said offline washing rotary speed can range between about 50 rpm and 500 rpm. In one embodiment, the offline washing rotary speed ranges between about 100 rpm and 400 rpm. According to another embodiment, the offline washing rotary speed ranges between about 200 rpm and about 300 rpm. The ranges of the offline washing speed mentioned herein are given by way of example only, and shall not be construed as limiting the scope of the present disclosure.

The low speed turning motor may be a low-power motor, having, for example, a rated power of between about 1 kW and about 20 kW. According to one embodiment the rated power of the low-power motor is between about 2 kW and about 15 kW. According to another embodiment, the rated power of the low-power motor is between about 5 kW and about 12 kW. These values are given by way of example only, and can vary, for example, depending upon the kind and number of centrifugal compressors forming the load, as well as upon other parameters, such as the dimension of the gas turbine, the number of compression and expansion stages and other design parameters.

The high speed turning motor may have a higher rated power of, for example, between about 20 kW and about 100 kW. According to one embodiment, the rated power of the high speed turning motor is between about 30 kW and about 80 kW. According to another embodiment, the rated power of the high speed turning motor is between about 40 kW and about 50 kW. These values are given by way of example only, and can vary, for example, depending upon the kind and number of centrifugal compressors forming the load as well as upon other parameters, such as the dimension of the gas turbine, the number of compression and expansion stages and other design parameters.

The dual-speed turning gear can be controlled as follows. When the gas turbine 103 requires offline washing, the high pressure compressor 107 and the high pressure turbine 109 can be driven into rotation by the auxiliary motor 131 having a relatively limited rated power. The remaining turbomachinery, including the low pressure compressor 105, the power turbine 111 and the load 104 require a higher torque to start rotating and a higher power to be maintained in continuous rotation at the offline washing rotary speed required to achieve efficient washing of the axial compressor 105. The slow speed turning motor 145 is used to overcome the breakaway torque of the turbomachinery, which requires high torque to be applied to the shaft 128. The torque required to start rotation of the turbomachinery is achieved by properly selecting the slow speed turning motor 145 and due to the very high reduction ratio achieved by the combined cascade arrangement of the first worm gear 149 and the second worm gear 153. The synchro self-shifting clutch 157 connects the output shaft 156 of the dual-speed turning gear 141 with the shaft 128 of the load and the torque generated by the slow speed turning motor 145 is transmitted to the load 104 and to the gas turbine 101, starting rotation of the turbomachines forming the load 104 as well as the power turbine 111 and the low pressure compressor 105.

Once the output shaft 156 of the dual-speed turning gear 141 has achieved a sufficient rotary speed, e.g. in the range of about 1 rpm to about 10 rpm, further angular acceleration can be imparted by the high speed turning motor 161. When the speed of the shaft 151, under the control of the high speed turning motor 161 exceeds the maximum output speed of the first worm gear 149, the overrunning clutch 152 disengages shaft 151 from the first, low speed turning motor 145, such that the second, high speed turning motor 161 can continue to angularly accelerate the shaft 128 until the final offline washing rotary speed is achieved.

When slow-rolling is required, for example, following a gas turbine shutdown, to prevent bowing of the centrifugal compressors 127, 129, the dual-speed turning gear 141 is controlled such that the shaft 126, 128 is maintained into a slow-rolling condition, not exceeding the speed, which can be reached by the slow speed turning motor 145. The latter has sufficient power to maintain the turbomachinery in the slow-rolling condition and the second, high speed turning motor 161 does not require to be activated. If the gas turbine 103 is re-started while the load is in the slow-rolling condition, the synchro self-shifting clutch 157 will disengage the dual-speed turning gear 141 from the shaft 128 automatically.

According to embodiments of the present invention, a dual-speed turning gear is combined to a multiple shaft gas turbine arrangement, wherein the multiple shaft gas turbine drives a load, wherein the load is drivingly connected to the power turbine and the latter is in turn connected to at least one compressor of the gas turbine, the compressor requiring offline washing. The dual-turning gear comprises a motor arrangement which can drive the output shaft of the dual-speed turning gear at least two different stationary rotary speeds. In some embodiments two motors are used, for example, electric motors, such as for example AC motors. In some embodiments three phase motors can be used, but other movers can be envisaged, such as one-phase AC motors or DC motors. When two motors are used, said motors can also be of different kind, for example, a DC and an AC motor, respectively. The motors can be equal to one another and an arrangement of gear reducers be provided, to drive the output shaft of the dual-speed turning gear at different speeds, as required for performing various actions on the turbomachinery connected thereto, as will become clearer from the description here below. In some embodiments, however, motors of different rated power and/or different rpms are used. Moreover, the two motors can provide different torques. A low speed motor and a high speed motor can be used. The term "high speed" and "low speed" are referred to relative rotary speeds of the output shaft. The dual-speed turning gear is therefore designed such that the low speed motor will drive the output shaft of the dual-speed turning gear at a first rotary speed and the high speed motor will drive the output shaft of the dual-speed turning gear at a second rotary speed, wherein the second rotary speed being higher than the first rotary speed.

The multi-shaft gas turbine can comprise only two co-axially arranged shafts. Other embodiments can comprise more than two shafts, additional further compressor(s) and/or power turbines, combined with the high and low pressure compressor and the high pressure turbine and power turbine.

According to one embodiment of the present invention, an apparatus for driving a load is provided. The apparatus comprises a multiple-shaft gas turbine, comprised of: a high pressure compressor and a high pressure turbine drivingly connected to one another by a first gas turbine shaft; and a low pressure compressor and a power turbine drivingly connected to one another by a second gas turbine shaft, extending coaxial with said first gas turbine shaft, as well as coaxial with said high pressure compressor and said high pressure turbine. The apparatus further comprises a load coupling which drivingly connects the power turbine to the load. The apparatus further comprises a dual-speed turning gear with an output shaft drivingly engageable to and disengageable from said load. The dual-speed turning gear comprises a low speed turning motor and a high speed turning motor, said low speed turning motor and said high speed turning motor being arranged and controlled to selectively drive said load at a first rotary speed and at a second rotary speed, the first rotary speed being lower than the second rotary speed. Engagement of the dual-speed turning gear to the load and disengagement therefrom can be obtained by means of an engageable and disengageable joint, such as a clutch. In some embodiments, a synchro self-shifting clutch can be used for that purpose. This kind of clutch makes engagement and disengagement particularly swift and reliable. Other clutches or clutch systems can be used.

In some embodiments of the present invention, as will be disclosed, the output shaft of the dual-speed turning gear is engageable frontally to the load. For example, the output shaft of the dual-speed turning gear can be engageable to the shaft of the last one of a series of compressors forming a compressor train or of just one compressor, forming the load driven by the gas turbine. Different arrangements are not excluded, such as one using a gearbox positioned between the last compressor of a compressor train or the compressor forming the load, and the output shaft of the dual-speed turning gear.

In some embodiments of the present invention the load can comprise at least one centrifugal compressor, or else a plurality of centrifugal compressors. In other embodiments, other rotary machines, different from centrifugal compressors can be connected to the gas turbine, possibly in combination with centrifugal compressors.

In some embodiments of the present invention, an overrunning clutch can be provided to disengage the slow speed turning motor from the output shaft of the dual-speed turning gear when the high speed turning motor accelerates the output shaft of the dual-speed turning gear beyond the maximum speed provided for by the low speed turning motor.

An exemplary embodiment of the dual-speed turning gear comprises a clutch arrangement which is designed and arranged such that the output shaft of the dual-speed turning gear will be rotated by the slow speed turning motor until a first rotary speed and will be rotated by the high speed turning motor when the rotary speed of the output shaft exceeds said first rotary speed. An overrunning clutch can be used for that purpose, arranged between the slow speed turning motor and the output shaft of the dual-speed turning gear, such that the high speed turning motor will take over control of the output shaft once the speed thereof exceeds the speed imposed by the low speed turning motor.

In some embodiments a first clutch can be provided, selectively engaging and disengaging the output shaft of said dual-speed turning gear to said load and a second clutch selectively engaging the low speed turning motor to the output shaft and disengaging it there from.

The dual-speed turning gear can comprise gear arrangements to provide the proper ratio between the rotary speed of the slow speed turning motor and the output shaft of the dual-speed turning gear as well as between the rotary speed of the high speed turning motor and said output shaft. The gear arrangement can comprise at least one worm gear. In some embodiments, two worm gears are arranged in a cascade fashion, i.e. in sequence. The rotary speed of the slow speed turning motor will then be reduced twice by two sequentially arranged worm gears, to drive the output shaft at a first slow speed rotary motion. The rotary speed of the high speed turning motor can be reduced through only one of said worm gears to rotate the output shaft of the dual-speed turning gear at a higher rotary speed.

According to some embodiments, during offline washing of the gas turbine the dual-speed turning gear is arranged and controlled such as to initially accelerate the load, the low pressure compressor and the power turbine from a stationary condition to a first rotary speed by means of the low speed turning motor and subsequently to further accelerate the load, the low pressure compressor and the power turbine from the first rotary speed to a second rotary speed, higher than said first rotary speed. The second rotary speed can be an offline washing speed which is maintained during offline washing of the gas turbine.

In some embodiments the slow speed turning motor and the high speed turning motor are arranged and controlled such that during slow-rolling of the load, rotation of said load is controlled by said low speed turning motor.

An auxiliary turning motor may be provided for driving into rotation said high pressure compressor and said high pressure turbine. Such auxiliary turning motor can be the onboard starting motor of the gas turbine itself. The auxiliary turning motor can be used for slow turning the core of the gas turbine, i.e. the high pressure compressor and the high pressure turbine after shut down of the gas turbine, to prevent bowing of the rotor aggregate of said core. The same auxiliary turning motor can be used as a starter, to start rotation of the high pressure compressor and high pressure turbine of the gas turbine. The low pressure compressor and the low pressure turbine are not mechanically connected to the turbine core and therefore the auxiliary turning motor acting as a starter does not require driving into rotation the low pressure compressor and low pressure turbine as well as the load connected thereto.

According to a further aspect, the disclosure relates to a method for offline washing a multiple shaft gas turbine, such as a twin-shaft gas turbine, connected to a load. A dual-speed turning gear is selectively drivingly connected to the load driven by the multiple shaft gas turbine and is used to gradually accelerate the load and the power turbine, along with the low pressure compressor of the gas turbine to an offline washing rotary speed. A slow speed turning motor and a high speed turning motor can be used in sequence to accelerate the apparatus as required.

According to some embodiments of the method disclosed herein, offline washing is performed on a gas turbine comprising: a high pressure compressor and a high pressure turbine drivingly connected to one another by a first gas turbine shaft; a low pressure compressor and a power turbine drivingly connected to one another by a second gas turbine shaft, extending coaxial with said first gas turbine shaft, said high pressure compressor and said high pressure turbine. In some embodiments, the method comprises the steps of providing a dual-speed turning gear with an output shaft drivingly engageable to and disengageable from the load, wherein the dual-speed turning gear comprises a low speed turning motor and a high speed turning motor, initially accelerating the low pressure compressor, the power turbine and the load with the low speed turning motor up to a first rotary speed, when the first rotary speed is reached, continuing accelerating the low pressure compressor, the power turbine and the load with the high speed turning motor until an offline washing rotary speed is reached, and maintaining the offline washing rotary speed while washing said gas turbine.

According to some embodiments, a further shaft of the gas turbine, on which turbomachinery other than the power turbine and the low pressure compressor are supported, can be turned at the offline washing speed by an auxiliary turning motor, e.g. an onboard starting motor of the gas turbine itself.

According to further embodiments, the dual-speed turning gear is used alternatively to rotate the gas turbine components during offline washing and during slow-roll following turbine shutdown, for example, in order e.g. to prevent bowing of the centrifugal compressors connected to the power turbine via the load coupling. The method can comprise the steps of: shutting down the gas turbine; slow-rolling the load, the low pressure compressor and the power turbine by means of the slow turning motor of said dual-speed turning gear, until a required temperature profile of said load is achieved.

The disclosure herein also concerns a method of slow-rolling a multi-shaft gas turbine connected to a load, said gas turbine comprising: a high pressure compressor and a high pressure turbine drivingly connected to one another by a first gas turbine shaft; a low pressure compressor and a power turbine drivingly connected to one another by a second gas turbine shaft, extending coaxial with said first gas turbine shaft, said high pressure compressor and said high-pressure turbine. In some embodiments, the method comprises the steps of providing a dual-speed turning gear with an output shaft drivingly engageable to and disengageable from the load, wherein the dual-speed turning gear comprises a low speed turning motor and a high speed turning motor, selectively slow-rolling the load and the second gas turbine shaft at a slow-rolling speed with the slow speed turning motor during cooling of the gas turbine and the load following shut-down of the gas turbine, or rolling the load and the second gas turbine shaft at an offline washing speed, with the high speed turning motor during offline washing of the gas turbine, the offline washing speed being higher than said slow-rolling speed.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. An apparatus for driving a load, the apparatus comprising:
  a multiple-shaft gas turbine comprising:
    a high pressure compressor and a high pressure turbine drivingly connected to one another by a first gas turbine shaft;
    a low pressure compressor and a power turbine drivingly connected to one another by a second gas turbine shaft extending coaxial with the first gas turbine shaft, the high pressure compressor and the high pressure turbine;
    a load coupling drivingly connecting the power turbine to the load; and
    a dual-speed turning gear comprises a first worm gear and a second worm gear with an output shaft drivingly engageable to and disengageable from the load, the dual-speed turning gear comprising a low speed turning motor and a high speed turning motor, wherein the low speed turning motor and the high speed turning motor are configured to selectively drive the load,
      wherein the dual-speed turning gear is configured to slow-roll the load, the power turbine, and the low pressure compressor when the gas turbine is shut down and rotate the power turbine, the low pressure compressor, and the load during offline washing of the gas turbine, and
wherein a shaft of the second worm gear is connected on a first end to the low speed turning motor and at a second end to the high speed turning motor, and wherein a clutch is arranged between the second end of the shaft of the second worm gear and an output shaft of the high speed turning motor such that when the rotary speed of the output shaft of the high speed turning motor exceeds the rotary speed of the shaft of the second worm gear, the high speed turning motor takes control over the second worm gear.

2. The apparatus according to claim 1, wherein an auxiliary turning motor is configured to perform at least one of starting rotation of the high pressure compressor and the high pressure turbine and slow-turning the high pressure compressor and the high pressure turbine.

3. The apparatus according to claim 1, wherein the load comprises at least one centrifugal compressor.

4. The apparatus according to claim 1, wherein the load comprises a plurality of centrifugal compressors.

5. The apparatus according to claim 1, wherein the dual-speed turning gear comprises an overrunning clutch to disengage the low speed turning motor from the output shaft of the dual-speed turning gear when the high speed turning motor accelerates the output shaft beyond a maximum speed provided for by the low speed turning motor.

6. The apparatus according to claim 5, wherein the dual-speed turning gear comprises a clutch arrangement arranged so that the output shaft of the dual-speed turning gear is rotated by the low speed turning motor to a first rotary speed, and is rotated by the high speed turning motor when the rotary speed of the output shaft exceeds the first rotary speed.

7. The apparatus according to claim 6, wherein the dual-speed turning gear comprises an overrunning clutch arranged between the low speed turning motor and the output shaft such that the high speed turning motor takes over control of the output shaft once the speed of the output shaft exceeds the speed imposed by the low speed turning motor.

8. The apparatus according to claim 1, wherein the dual-speed turning gear comprises a first clutch selectively engaging and disengaging the output shaft of the dual-speed turning gear to and from the load, and a second clutch selectively engaging and disengaging the low speed turning motor to and from the output shaft.

9. The apparatus according to claim 1, wherein the dual-speed turning gear comprises at least one worm gear.

10. The apparatus according to claim 1, wherein the rotary speed of the low speed turning motor is transmitted to the output shaft of the dual-speed turning gear through the first worm gear and the second worm gear in series.

11. The apparatus according to claim 1, wherein the rotary speed of the high speed turning motor is transmitted to the output shaft of the dual-speed turning gear through the second worm gear.

12. The apparatus according to claim 1, wherein the dual-speed turning gear is configured to drive the apparatus during offline washing of the gas turbine by initially accelerating the load, the low pressure compressor and the power turbine from a stationary condition to a first rotary speed with the low speed turning motor, and subsequently by further accelerating the load, the low pressure compressor and the power turbine from the first rotary speed to a second rotary speed, wherein the second rotary speed is higher than the first rotary speed.

13. The apparatus according to claim 1, wherein the low speed turning motor and the high speed turning motor are arranged such that during slow-rolling of the load, rotation of the load is controlled by the low speed turning motor.

14. The apparatus according to claim 1, further comprising an auxiliary turning motor configured to drive the high pressure compressor and the high pressure turbine into rotation, wherein the auxiliary turning motor is configured to operate as at least one of a slow-rolling motor for slow-turning the high pressure compressor and the high pressure turbine following shut down of the gas turbine, and a starter for starting rotation of the high pressure compressor and the high pressure turbine when the gas turbine is started.

15. A method for offline washing of a multiple shaft gas turbine connected to a load, the gas turbine comprising a high pressure compressor and a high pressure turbine drivingly connected to one another by a first gas turbine shaft, a low pressure compressor and a power turbine drivingly connected to one another by a second gas turbine shaft extending coaxial with the first gas turbine shaft, the high pressure compressor and the high pressure turbine, the method comprising:
providing a dual-speed turning gear comprising a first worm gear and a second worm gear with an output shaft drivingly engageable to and disengageable from the load, wherein the dual-speed turning gear comprises a low speed turning motor and a high speed turning motor,
slow-rolling, using the dual-speed turning gear, the load, the power turbine, and the low pressure compressor when the gas turbine is shut down and rotating the power turbine, the low pressure compressor, and the load during offline washing of the gas turbine;
initially accelerating the low pressure compressor, the power turbine and the load with the low speed turning motor up to a first rotary speed;
when the first rotary speed is reached, continuing accelerating the low pressure compressor, the power turbine and the load with the high speed turning motor until an offline washing rotary speed is reached;
maintaining the offline washing rotary speed while washing the gas turbine; and
taking control, using the high speed turning motor, over the second worm gear if a rotary speed of an output shaft of the high speed turning motor exceeds a rotary speed of a shaft of the second worm gear, wherein a shaft of a second worm gear is connected on a first end to the low speed turning motor and at a second end to the high speed turning motor, and wherein a clutch is arranged between the second end of the shaft of the second worm gear and the output shaft of the high speed turning motor.

16. The method according to claim 15, further comprising accelerating the high pressure compressor and the high pressure turbine using an auxiliary turning motor.

17. The method according to claim 15, further comprising:
shutting down the gas turbine; and
slow-rolling the load, the low pressure compressor and the power turbine using the low speed turning motor until a required temperature profile of the load is achieved.

18. The method according to claim 15, wherein the load comprises at least one compressor.

19. The method according to claim 15, wherein the load comprises a train of compressors.

20. The method according to claim 15, further comprising slow-rolling the high pressure turbine and the high pressure compressor of the gas turbine using an auxiliary turning motor after shut-down of the gas turbine.

21. A method of offline washing of a multi-shaft gas turbine and a load connected to the gas turbine, the gas turbine comprising a high pressure compressor and a high pressure turbine drivingly connected to one another by a first gas turbine shaft, a low pressure compressor and a power turbine drivingly connected to one another by a second gas turbine shaft extending coaxial with the first gas turbine shaft, the high pressure compressor and the high-pressure turbine, the method comprising:

providing a dual-speed turning gear comprising a first worm gear and a second worm gear with an output shaft drivingly engageable to and disengageable from the load, wherein the dual-speed turning gear comprises a low speed turning motor and a high speed turning motor;

selectively slow-rolling the load and the second gas turbine shaft at a slow-rolling speed with the low speed turning motor during cooling of the gas turbine and the load following shut-down of the gas turbine; or rolling the load and the second gas turbine shaft at an offline washing speed, with the high speed turning motor during offline washing of the gas turbine, the offline washing speed being higher than the slow-rolling speed; and taking control, using the high speed turning motor, over the second worm gear if a rotary speed of an output shaft of the high speed turning motor exceeds a rotary speed of a shaft of the second worm gear, wherein a shaft of the second worm gear is connected on a first end to the low speed turning motor and at a second end to the high speed turning motor, and wherein a clutch is arranged between the second end of the shaft of the second worm gear and the output shaft of the high speed turning motor.

22. The method according to claim 21, further comprising slow-rolling the high pressure compressor and the high pressure turbine with an auxiliary turning motor following shut-down of the gas turbine.

* * * * *